(12) United States Patent
Bauer et al.

(10) Patent No.: US 11,249,489 B2
(45) Date of Patent: Feb. 15, 2022

(54) METHOD FOR DETERMINING A VERTICAL PATH OF AN AIRCRAFT FROM ITS CURRENT POSITION, ASSOCIATED COMPUTER PROGRAM PRODUCT AND DETERMINING SYSTEM

(71) Applicant: THALES, Courbevoie (FR)

(72) Inventors: Manuel Bauer, Toulouse (FR); Geoffrey Durand, Toulouse (FR)

(73) Assignee: Thales, Courbevoie (FR)

( * ) Notice: Subject to any disclaimer, the term of this patent is extended or adjusted under 35 U.S.C. 154(b) by 139 days.

(21) Appl. No.: 16/019,354

(22) Filed: Jun. 26, 2018

(65) Prior Publication Data
US 2019/0005827 A1    Jan. 3, 2019

(30) Foreign Application Priority Data
Jun. 30, 2017    (FR) ...................................... 17 00697

(51) Int. Cl.
*G05D 1/06*       (2006.01)
*G08G 5/00*       (2006.01)
*G01C 23/00*      (2006.01)

(52) U.S. Cl.
CPC ......... *G05D 1/0607* (2013.01); *G01C 23/005* (2013.01); *G05D 1/0653* (2013.01);
(Continued)

(58) Field of Classification Search
CPC .. G08G 5/0021; G08G 5/0039; G08G 5/0034; G08G 5/0043; G08G 5/00;
(Continued)

(56) References Cited

U.S. PATENT DOCUMENTS 9,323,248 B2 *  4/2016  Mere ........................ G05D 1/00
9,360,866 B2 *  6/2016  Gutierrez-Castaneda ...................
                                                B64C 13/18
(Continued)

FOREIGN PATENT DOCUMENTS

FR    2 953 627 A1    6/2011
FR    2 994 312 A1    2/2014
FR    3 023 014 A1    1/2016

OTHER PUBLICATIONS

Search Report dated Feb. 23, 2018 in FR 17 00697, filed Jun. 30, 2017.

*Primary Examiner* — Fadey S. Jabr
*Assistant Examiner* — Mohamed Abdo Algehaim
(74) *Attorney, Agent, or Firm* — Knobbe, Martens, Olson & Bear, LLP (57)    ABSTRACT

A method of determining a vertical path of an aircraft from its current position, an associated computer program product and a determining system are disclosed. In one aspect, the method includes determining a vertical path of the aircraft including determining an initial path segment and N following path segments, composing the vertical path of the aircraft from the determined path segments and freezing this vertical path. The method further includes determining a status of each of the altitude constraints along the entire vertical path of the aircraft, each status being chosen between an achievable status when the corresponding altitude constraint is satisfied and a missed status otherwise, and displaying the vertical path of the aircraft and statuses of the determined altitude constraints to the operator.

14 Claims, 3 Drawing Sheets

(52) U.S. Cl.
CPC ......... *G05D 1/0669* (2013.01); *G05D 1/0676* (2013.01); *G08G 5/0021* (2013.01); *G08G 5/0034* (2013.01); *G08G 5/0039* (2013.01)

(58) Field of Classification Search
CPC ...... G08G 5/006; G08G 5/003; G08G 5/0047; G08G 5/0052; G08G 5/0056; G08G 5/0065; G08G 5/0069; G08G 5/0073; G08G 5/0078; G08G 5/0082; G08G 5/06; G08G 5/065; G05D 1/101; G05D 1/0676; G05D 1/0669; G05D 1/0653; G05D 1/0607; G05D 1/04; G05D 1/042; G05D 1/044; G05D 1/046; G05D 1/048; G05D 1/06; G05D 1/0615; G05D 1/0623; G05D 1/063; G05D 1/0638; G05D 1/0646; G05D 1/0661; G05D 1/0684; G05D 1/0688; G05D 1/0692; G05D 1/10; G05D 1/102; G05D 1/104; G05D 1/105; G05D 1/106; G05D 1/108; G05D 1/12; G01C 23/005; G01C 23/00; B64C 1/00–2230/28
USPC ...................................................... 701/120
See application file for complete search history.

(56) References Cited

U.S. PATENT DOCUMENTS

| | | | | |
|---|---|---|---|---|
| 9,688,417 B2* | 6/2017 | Labastie | ............... | B64D 43/02 |
| 10,060,747 B2* | 8/2018 | Block | ................... | G01C 23/00 |
| 2009/0076717 A1* | 3/2009 | Goutelard | ............. | G01C 21/00 |
| | | | | 701/122 |
| 2010/0125382 A1* | 5/2010 | Wachenheim | ....... | G05B 19/416 |
| | | | | 701/18 |
| 2010/0324812 A1* | 12/2010 | Sacle | .................... | G01C 21/00 |
| | | | | 701/467 |
| 2011/0137495 A1* | 6/2011 | Sacle | .................. | G05D 1/0676 |
| | | | | 701/3 |
| 2012/0029735 A1* | 2/2012 | Bakker | ................ | G05D 1/0607 |
| | | | | 701/3 |
| 2012/0029737 A1* | 2/2012 | Marty | .................. | G08G 5/0021 |
| | | | | 701/3 |
| 2012/0083946 A1* | 4/2012 | Maldonado | ............ | G06Q 10/06 |
| | | | | 701/3 |
| 2013/0085669 A1* | 4/2013 | Bailey | ................. | G08G 5/0039 |
| | | | | 701/467 |
| 2014/0172204 A1* | 6/2014 | Coulmeau | ........... | G08G 5/0039 |
| | | | | 701/14 |
| 2014/0244077 A1* | 8/2014 | Laso-Leon | ........... | G05D 1/0607 |
| | | | | 701/4 |
| 2015/0254989 A1* | 9/2015 | Kozlow | ............... | G08G 5/0047 |
| | | | | 701/466 |
| 2015/0378358 A1* | 12/2015 | Gutierrez-Castaneda | .................... |  |
| | | | | B64C 13/18 |
| | | | | 701/8 |
| 2016/0093223 A1* | 3/2016 | Caudron | .................. | G01D 7/00 |
| | | | | 701/3 |
| 2016/0138936 A1* | 5/2016 | He | .......................... | G06T 11/20 |
| | | | | 345/680 |
| 2017/0323573 A1* | 11/2017 | Decker | .................... | B64D 31/02 |
| 2017/0365178 A1* | 12/2017 | Shay | .................... | G08G 5/0034 |
| 2018/0018885 A1* | 1/2018 | Khatwa | ................ | G05D 1/0061 |
| 2018/0273200 A1* | 9/2018 | De Villele | ............. | B64D 45/08 |
| 2018/0284813 A1* | 10/2018 | Boyer | .................... | G08G 5/025 |
| 2018/0292841 A1* | 10/2018 | Bothwell | ................ | B64C 27/06 |
| 2019/0139424 A1* | 5/2019 | Shay | .................... | G08G 5/0043 |
| 2019/0164440 A1* | 5/2019 | Briand | ................. | G08G 5/0047 |
| 2021/0097869 A1* | 4/2021 | Piradi | ................... | G08G 5/0086 |

* cited by examiner

METHOD FOR DETERMINING A VERTICAL PATH OF AN AIRCRAFT FROM ITS CURRENT POSITION, ASSOCIATED COMPUTER PROGRAM PRODUCT AND DETERMINING SYSTEM

CROSS-REFERENCE TO RELATED APPLICATIONS

This patent application claims the benefit under 35 U.S.C. § 119 of French Application No. FR 17 00697 filed on Jun. 30, 2017 which is hereby incorporated by reference in its entirety.

BACKGROUND

Technological Field

The described technology generally relates to a method of determining a vertical path of an aircraft from its current position.

The described technology also relates to an associated computer program product and determining system.

Description of the Related Technology

In the related technology, flight management systems (FMS) can be used to determine one or several vertical paths of the aircraft.

In particular, flight management systems make it possible to determine these vertical paths in real-time based on vertical guiding modes that are engaged by an automatic pilot in particular during climb and descent phases of the aircraft. Among these guiding modes, an automatic guiding mode, called managed guiding mode, makes it possible to guide the aircraft automatically following a reference profile determined beforehand by the flight management system.

Among the paths determined by the real-time flight management systems, a vertical path is in particular distinguished starting from the current position of the aircraft and extending to its final destination using the hypothesis of guiding by the automatic guiding mode following the reference profile, and a vertical path determined considering the current guiding mode engaged by the automatic pilot until reaching a piloting instruction introduced by the pilot. This piloting instruction for example has a clearance altitude, i.e., an altitude authorized by an air traffic control entity.

Some flight management systems also extend this vertical path from the point in which the piloting instruction must be reached, by a plateau path.

However, flight management systems may not give the pilot the overall visibility of the vertical path of the aircraft, in particular in case of deviation relative to the reference profile. This does not allow the pilot good anticipation of possible situations during vertical guiding of the aircraft, in particular the presence of altitude constraints, which makes the pilot's task relatively difficult.

SUMMARY OF CERTAIN INVENTIVE EMBODIMENTS

One aim of some embodiments of the described technology is to simplify the task of the pilot or any other operator on board or on the ground during the vertical guiding of the aircraft.

Thus, one inventive aspect is a method for determining a vertical path of an aircraft from its current position, the aircraft being piloted by an operator and being guided by an automatic pilot according to an initial vertical guiding mode, in the presence of a plurality of altitude constraints and according to at least one piloting instruction.

The method can include the following steps carried out consecutively:

determining a vertical path of the aircraft including sub-steps of:

determining an initial path segment with the initial vertical guiding mode from the current position of the aircraft to a selection point, and N following path segments, each following path segment being determined with a following vertical guiding mode implemented by the automatic pilot and extending between two consecutive selection points or between a selection point and a final point corresponding to the final destination of the aircraft, the or each selection point corresponding to a point in which a piloting instruction is reached;

at least one following vertical guiding mode being separate from the initial vertical guiding mode or another following vertical guiding mode, and a plateau guiding mode;

the number N being greater than or equal to 1;

composing the vertical path of the aircraft from determined path segments and freezing this vertical path;

determining a status of each of the altitude constraints along the entire vertical path of the aircraft, each status being chosen between an achievable status when the corresponding altitude constraint is satisfied during the passage of the aircraft along the vertical path of the aircraft, and a missed status otherwise;

displaying the vertical path of the aircraft and the statuses of the determined altitude constraints to the operator.

According to other advantageous aspects, the method comprises one or more of the following features, considered alone or according to all technically possible combinations:

at least one following vertical guiding mode, the piloting instruction associated with this following vertical guiding mode and the instruction associated with the initial vertical guiding mode are defined by the operator or are communicated by an air traffic control entity or by an avionics system;

for each altitude constraint having the missed status, the step for determining statuses further comprises determining an altitude error corresponding to the vertical distance between this altitude constraint and the vertical path of the aircraft;

the display step further comprises displaying the or each determined altitude error;

at least one following vertical guiding mode is an automatic vertical guiding mode;

when, during the determination of a following path segment with the automatic vertical guiding mode, at least one altitude constraint is on the same altitude as the selection point from which this following path segment extends, this following path segment comprises a horizontal path extending up to said altitude constraint;

during the determination of a following path segment with the automatic vertical guiding mode, this following path segment successively comprises a rejoining path and a path following a previously determined reference profile;

the rejoining path extending from the corresponding selection point up to the intersection with the reference profile and the following path extending from this intersection;

when the altitude of the corresponding selection point is located below the reference profile, the rejoining path has a horizontal path extending up to the intersection with the reference profile;

the display step further comprises displaying a symbol indicating the intersection of the rejoining path with the reference profile;

the or each piloting instruction is determined by one of the elements chosen from the group consisting of:
- altitude;
- length of time;
- horizontal distance from the current position of the aircraft;
- speed of the aircraft;
- intersection with the reference profile;
- intersection with a given lateral path.

Yet another aspect is a computer program product including software instructions which, when implemented by computer equipment, carry out the method as previously defined.

Still yet another aspect is a system for determining a vertical path of an aircraft from its current position, including a capability for carrying out the method as previously defined.

According to other advantageous aspects, the system can be on board the aircraft or have an off-board system interfaced with the aircraft.

BRIEF DESCRIPTION OF THE DRAWINGS

These features and advantages of the described technology will appear upon reading the following description, provided solely as a non-limiting example, and done in reference to the appended drawings, in which.

DETAILED DESCRIPTION OF CERTAIN INVENTIVE EMBODIMENTS

Figure 1:
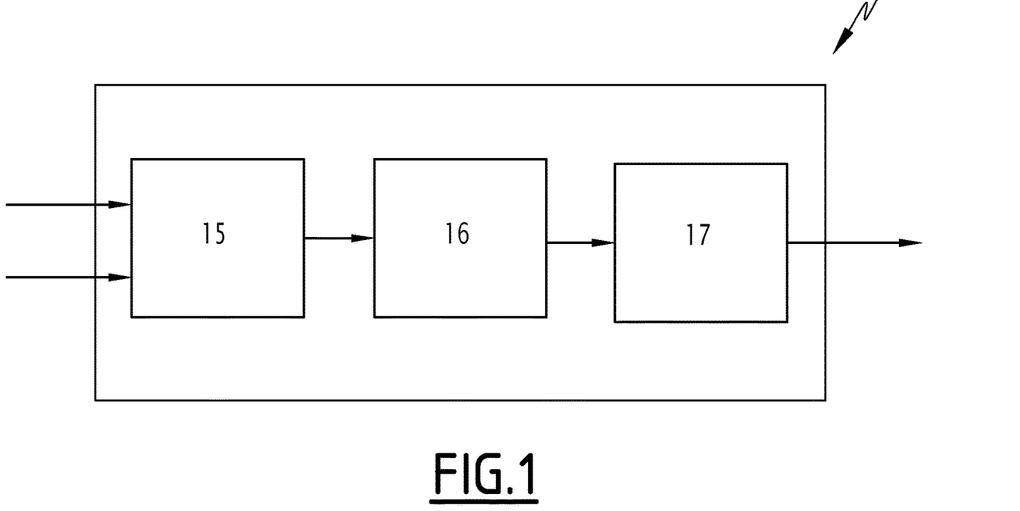
FIG. 1 is a schematic view of a determining system according to the described technology.

The determining system 10 illustrated in FIG. 1 makes it possible to determine a vertical path of an aircraft from the current position of this aircraft, and preferably up to its final destination.

"Aircraft" refers to any flying vehicle at least in the Earth's atmosphere and able to be piloted by an operator from a cockpit of this vehicle or from a remote piloting center. Examples of such an aircraft in particular include an airplane, helicopter or drone.

In the example described below, the aircraft is an airplane, in particular an airliner, including a flight management system of the FMS type, an automatic pilot and a communication system.

In a manner known in itself, the flight management system assumes the form of a computer in particular making it possible to determine a reference profile relative to the trajectory of the aircraft and predictions relative to this reference profile.

In particular, the reference profile is determined while respecting a flight plan of the aircraft for example introduced by the operator into the flight management system beforehand.

The predictions determined by the flight management system in particular comprise predictions relative to the passage time of the aircraft by different points of the reference profile as well as predictions relative to the fuel available at these different points.

The automatic pilot assumes the form of a computer allowing the operators to simplify the piloting of the aircraft, and in particular the guiding of the aircraft.

In a manner known in itself, the automatic pilot implements several guiding modes that define different automatic pilot methods of the aircraft.

Among these modes, a distinction is in particular made of the horizontal guiding modes and vertical guiding modes.

The vertical guiding modes make it possible to guide the aircraft in particular during climb and descent phases. Among these vertical guiding modes, the automatic pilot in particular carries out an automatic vertical guiding mode, called managed mode, making it possible to guide the aircraft automatically following the reference profile. Other vertical guiding modes of the aircraft are carried out by the automatic pilot in order to reach one or several piloting instructions introduced beforehand by the operator.

A piloting instruction is associated with a vertical guiding mode when this vertical guiding mode is implemented to reach this piloting instruction.

The communication system allows the operator for example to communicate with an air traffic control entity by using a voice link and/or a text link. During this communication, the air traffic control entity communicates with the operator for example for instructions regarding the altitude, passage time, speed, etc. of the aircraft. The instructions relative to the altitude are known as "clearance altitude" and then correspond to the flight altitudes authorized by the air traffic control entity.

To respect the communicated instructions, the operator for example introduces corresponding piloting instructions into the automatic pilot.

In general, each piloting instruction is determined by one of the elements chosen from the group consisting of:
- altitude;
- length of time;
- horizontal distance from the current position of the aircraft;
- speed of the aircraft;
- intersection with the reference profile;
- intersection with a given lateral path.

Thus, a piloting instruction is said to be achieved when the aircraft reaches the altitude determined by this piloting instruction or when the altitude reaches a determined position in the length of time determined by this piloting instruction or when the aircraft moves away from the position in which this piloting instruction has been given by the horizontal distance determined by this instruction or in case of deviation relative to the reference profile, when the aircraft rejoins the reference profile or when the aircraft intercepts a given lateral path.

In reference to FIG. 1, the determining system 10 comprises an acquisition module 15, a processing module 16 and an output module 17.

In the described example, the determining system 10 is integrated into the flight management system of the aircraft. In this case, the aforementioned modules for example assume the form of software programs that are then implemented by the computer forming the flight management system.

Alternatively, at least some of these modules assume the form, at least partially, of an independent electronic component, for example a field-programmable gate array (FPGA).

Also alternatively, the determining system 10 is integrated into any other avionics system, or assumes the form of an independent computer. In this last case, the determining system 10 further comprises a memory able to store a plurality of software programs, and in particular software programs forming the aforementioned modules, and a processor able to execute these programs.

Of course, other embodiments of the determining system 10 are also possible.

The input module 15 is able to acquire the current position of the aircraft, the reference profile, the current guiding mode implemented by the automatic pilot and one or several piloting instructions introduced by the operator.

These various data are provided by corresponding modules of the flight management system and by the automatic pilot or by any other avionics system.

The input module 15 is further able to acquire altitude constraints defining a lower limit altitude and/or an upper limit altitude that must be respected when the aircraft passes by a determined point. These altitude constraints are for example determined by the flight plan and/or communicated by the air traffic control entity.

The processing module 16 is able to process the various data acquired by the input module 15 so as to build a vertical path of the aircraft, as will be explained hereinafter, and to determine predictions relative to this path.

Lastly, the output module 17 is able to deliver the vertical path built from avionics systems using it, for example the flight management system and/or a display monitor showing a vertical profile of the aircraft to the operator.

Figure 2:
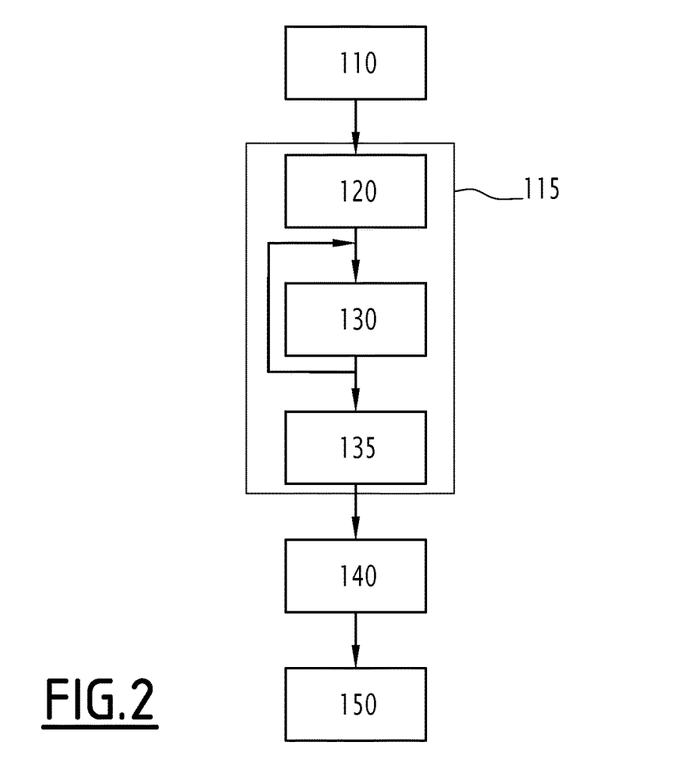
FIG. 2 is a flowchart of a determining method according to the described technology, the method being carried out by the determining system of FIG. 1.

The method for determining a vertical path implemented by the determining system 10 will now be explained in reference to FIG. 2, showing a flowchart of its steps and in reference to FIGS. 3 to 6 illustrating different example embodiments of these steps.

This method is in particular carried out during a climb phase and/or a descent phase of the aircraft, when a vertical guiding mode is engaged by the automatic pilot to achieve a piloting instruction. Subsequently, this current guiding mode will be designated by the term "initial vertical guiding mode".

Figure 3:
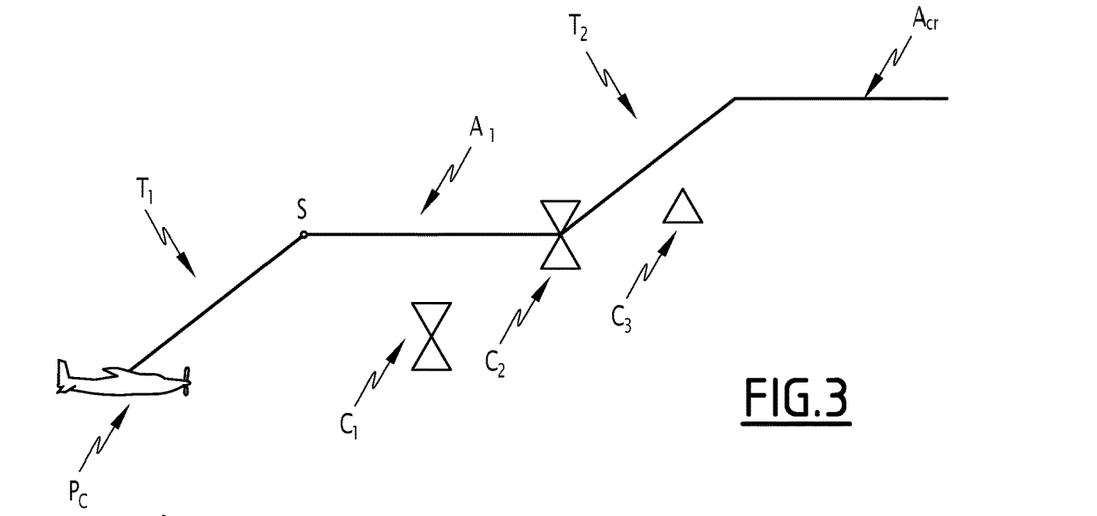
FIGS. 3 to 6 illustrate the implementation of the determining method of FIG. 2.

In the illustrated examples, FIG. 3 illustrates a vertical path of the aircraft in the climb phase from its current position $P_C$ until reaching a cruising altitude $A_{cr}$, in the presence of three altitude constraints $C_1$ to $C_3$.

Figure 4:
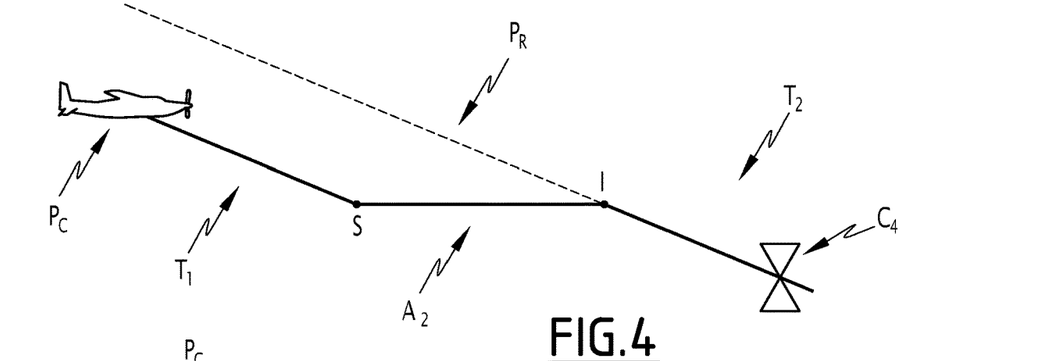

FIG. 4 illustrates a vertical path of the aircraft in the descent phase from its current position $P_C$, which is below the reference profile $P_R$, in the presence of an altitude constraint $C_4$.

Figure 5:
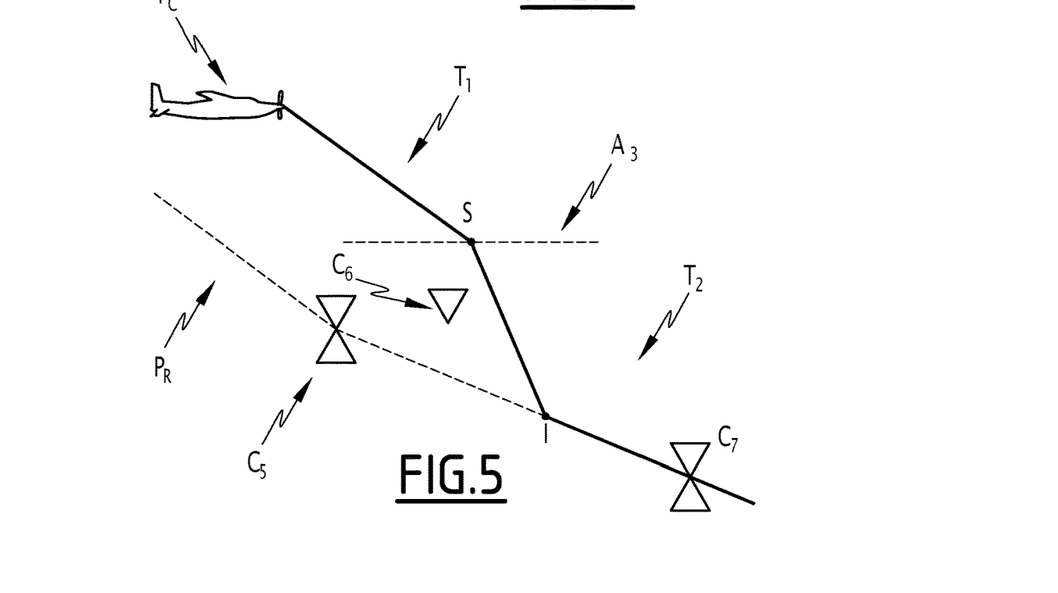

FIG. 5 illustrates a vertical path of the aircraft in the descent phase from its current position $P_C$, which is above the reference profile $P_R$, in the presence of three altitude constraints $C_5$ to $C_7$.

Figure 6:
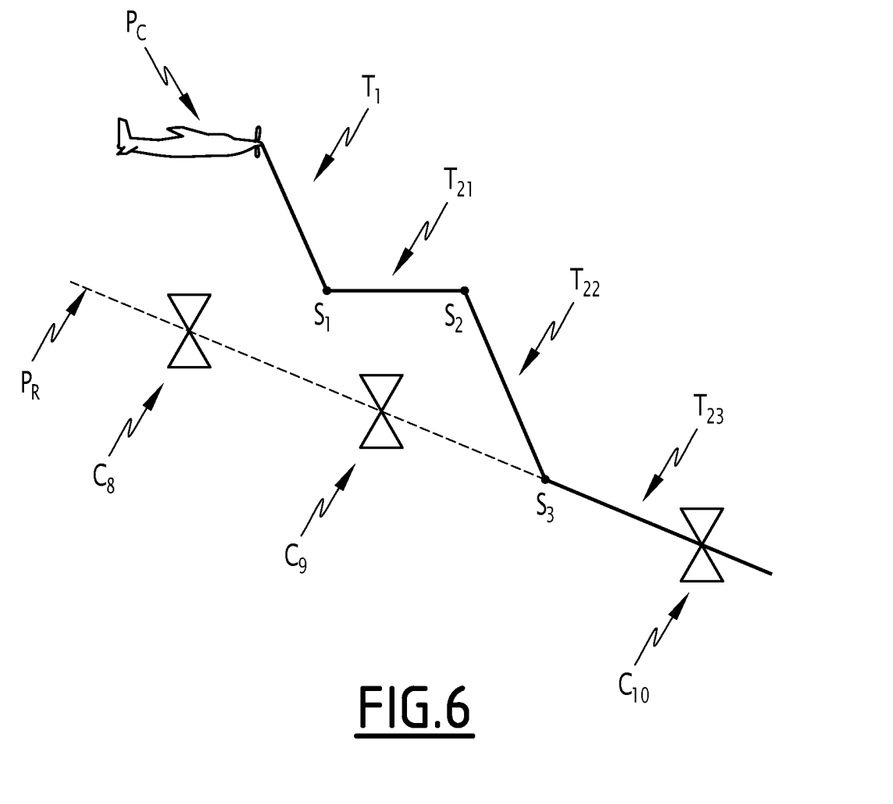

FIG. 6 illustrates a vertical path of the aircraft in the descent phase from its current position $P_C$, which is above the reference profile $P_R$, in the presence of three altitude constraints $C_5$ to $C_7$.

In the examples of the assembly of FIGS. 3 to 5, the piloting instruction relative to the initial vertical guiding mode comprises a clearance altitude $A_1$ to $A_3$.

In the example of FIG. 6, three piloting instructions to be achieved successively are imposed. In particular, the piloting instruction relative to the initial vertical guiding mode comprises a lateral instruction for example up to the intersection with a radial from a given point and the other two piloting instructions to be achieved successively respectively comprise flight for two minutes at a constant altitude and the intersection of the reference profile.

In all of the examples, it is also considered that the initial vertical guiding mode is separate from the automatic vertical guiding mode.

During the initial step 110 of the method, the input module 15 acquires the current position of the aircraft, the reference profile, the initial vertical guiding mode, N piloting instructions introduced by the operator and altitude constraints.

Each piloting instruction is sequenced according to the index i, then varying from 1 to N.

At the end of this step, the input module 15 sends all of the acquired data to the processing module 16.

During the following step 115, the processing module 16 determines a vertical path of the aircraft from its current position to its final destination.

This step 115 comprises several sub-steps.

In particular, during the sub-step 120, the processing module 16 determines an initial path segment with the initial vertical guiding mode.

This segment is determined from the current position of the aircraft and up to a point, called current selection point, in which the piloting instruction relative to the initial vertical guiding mode is achieved.

Thus, in the examples of FIGS. 3 to 6, the initial path segments are designated by reference $T_1$. These segments $T_1$ are therefore arranged upstream from the current selection points $S$, $S_1$ in which the corresponding piloting instructions are achieved.

During the following sub-step 130, the processing module 16 determines a following path segment from the current selection point up to a point, called final point, with a following vertical guiding mode implemented by the automatic pilot.

According to the described technology, this following vertical guiding mode is separate from the initial vertical guiding mode during at least one implementation of this sub-step 130.

Thus, the current selection point corresponds to a change point of the vertical guiding modes of the aircraft.

Furthermore, during at least one implementation of this sub-step 130, this following vertical guiding mode is separate from a plateau guiding mode. In other words, during the implementation of the sub-step 130, the following path segment determined with the following vertical guiding mode comprises at least two points with different altitudes.

According to one example embodiment, the following vertical guiding mode and the instructions associated with this mode as well as the initial guiding mode, are designated by the operator or are communicated by an air traffic control entity. In this case, the flight management system of the aircraft is adapted so as to allow the operator to impose this operational context. This designation is for example done from a screen of the flight management system and by using an appropriate communication interface.

The following path segment is for example determined by using a determining model known in itself, for example based on performances of the aircraft, regulations and a certain number of parameters adjustable for example by the operator before carrying out the method.

Furthermore, when the following vertical guiding mode is the automatic vertical guiding mode, the following path segment is further determined based on altitude constraints located downstream from the current selection point and in the descent phase, based on the reference profile.

Thus, for example, if an altitude constraint is present on the same altitude as the current selection point, the following segment comprises a horizontal path extending up to said altitude constraint.

Furthermore, when the following path segment is further determined as a function of the reference profile, this segment comprises a rejoining path and a following path of the reference profile.

In this case, the rejoining path extends from the corresponding selection point up to the intersection with the reference profile and the following path extends from this intersection following the reference profile.

Furthermore, when the altitude of the current selection point is located below the reference profile, the rejoining path has a horizontal path extending up to the intersection with the reference profile.

The final point used during this sub-step 130 to determine the following path segment is defined either as a following selection point in which a following piloting instruction is achieved, or as the final destination of the aircraft.

In particular, when the number N of transmitted instructions is equal to 1, the final point corresponds to the final destination of the aircraft during the first iteration of the sub-step 130. In this case, the following sub-step 135 is implemented directly.

When the number N is greater than 1, during the first iteration of the sub-step 130, the final point corresponds to a following selection point in which the piloting instruction associated with the index i=2 is achieved.

In this case, the processing module 16 carries out the sub-step 130 again, then considering this following selection point to be a new current selection point.

Thus, the processing module 16 reiterates the sub-step 130 until the piloting instruction associated with the index i=N is achieved. During this last iteration of the sub-step 130, the final point then corresponds to the final destination of the aircraft.

The number of iterations of sub-step 130 is thus equal to N.

In the examples of FIGS. 3 to 5, a single iteration of sub-step 130 has been carried out with the automatic vertical guiding mode. In these figures, the following path segments determined during this sub-step 130 are designated by reference $T_2$.

Furthermore, in the example of FIG. 3, the altitude constraint $C_2$ is located on the same altitude as the selection point S. Thus, in this example, the following segment $T_2$ determined during sub-step 130 comprises a horizontal path extending between the points S and $C_2$.

In the example of FIG. 5, the current position $P_C$ of the aircraft as well as the selection point S are arranged above the reference profile $P_R$. Thus, in this case, the following segment $T_2$ comprises a rejoining path extending between the selection point S and the intersection point I with the reference profile $P_R$, and a following path extending along the reference profile from the intersection point I.

In the example of FIG. 4, the current position $P_C$ of the aircraft as well as the selection point S are arranged below the reference profile $P_R$. Thus, in this case, the rejoining path of the following path segment $T_2$ has a horizontal path extending between the selection point S and the intersection point I with the reference profile $P_R$.

In the example of FIG. 6, three iterations of the sub-step 130 have been done and three following path segments have then been determined. These following segments have been designated using references $T_{21}$, $T_{22}$ and $T_{23}$.

Furthermore, in the example of this figure, three selection points $S_1$, $S_2$ and $S_3$ are determined. In particular, in these selection points $S_1$, $S_2$ and $S_3$, the piloting instructions respectively consisting of intercepting the aforementioned radial, flying for two minutes at a constant altitude and intercepting the reference profile are achieved.

In this case, the vertical guiding mode relative to the segment $T_{23}$ corresponds to the automatic guiding mode.

During the following sub-step 135, the processing module 16 then composes a vertical path of the aircraft for the previously determined path segments.

Thus, in the examples of FIGS. 3 to 5, the vertical path of the aircraft is made up of the segments $T_1$ and $T_2$. In the example of FIG. 6, the vertical path of the aircraft is made up of the segments $T_1$, $T_{21}$, $T_{22}$ and $T_{23}$.

Then, during this sub-step 135, the processing module 16 freezes the composed vertical path. It thus freezes the vertical path such that this path cannot be modified during the implementation of the following steps of the method.

Thus, the vertical path composed during this step is independent of the result of the implementation of the following steps of the method.

During the following step 140, if one or several altitude constraints are present, the processing module 16 determines statuses of these altitude constraints throughout the entire vertical path of the aircraft.

Advantageously, according to the described technology, the processing module 16 determines statuses of the constraints located downstream from the first selection point.

Each status is chosen between an achievable status when the corresponding altitude constraint is satisfied during the passage of the aircraft along the vertical path determined during the sub-step 135, and a missed status otherwise.

Preferably, during the same step 140, for each altitude constraint having the missed status, the processing module 16 further determines an altitude error corresponding to the vertical distance between this altitude constraint and the vertical path of the aircraft.

Thus, in the examples of FIGS. 3 to 6, the status of the constraints $C_1$, $C_5$, $C_6$, $C_8$ and $C_9$ is determined as missed by the processing module 16, the status of the constraints $C_2$, $C_3$, $C_4$, $C_7$ and $C_{10}$ being determined as achievable.

At the end of this step 140, the processing module 16 sends the determined vertical path and the statuses of the constraints to the output module 17.

During the following step 150, the output module 17 sends all of the received data to the corresponding avionics systems.

In particular, during this step, the output module 17 sends this data to a display screen in particular to display the vertical path with the corresponding altitude constraints. These constraints are for example displayed differently based on their status.

Furthermore, if applicable, each altitude constraint having the missed status is displayed with the corresponding error.

Lastly, if applicable, the intersection point of the rejoining path with the reference profile is displayed with a symbol dedicated to that purpose. In this case, the rejoining path is also displayed on the corresponding display screen.

One can then see that the present described technology has a certain number of advantages.

First, the method according to the described technology makes it possible to determine a complete vertical path of the aircraft in case of flight with a non-managed guiding mode.

This then gives the operator overall visibility of his vertical trajectory and makes it possible to better anticipate certain situations during such vertical guiding, for example the passage via altitude constraints.

Furthermore, the method according to the described technology makes it possible to determine the statuses of all of the constraints throughout the entire vertical path of the aircraft.

Furthermore, the method according to the described technology makes it possible to determine a complete vertical trajectory of the aircraft when more than two vertical guiding modes are implemented by the automatic pilot. This therefore gives the operator complete visibility of this path up to the final destination of the aircraft.

One can then see that this greatly simplifies the operator's task.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method of determining a vertical path of an aircraft initiated from a current position, the aircraft being piloted by an operator and being guided by an automatic pilot according to an initial vertical guiding mode, in the presence of a plurality of altitude constraints and according to at least one piloting instruction, the method including:
    determining a vertical path of the aircraft including:
        determining an initial path segment with the initial vertical guiding mode from the current position of the aircraft to a selection point, and a number N of subsequent path segments, the number N being greater than or equal to 1, each subsequent path segment being determined with a following vertical guiding mode implemented by the automatic pilot and extending between two consecutive selection points or between a selection point and a final point corresponding to a final destination of the aircraft, each of the selection points corresponding to a point in which a piloting instruction is achieved;
    at least one of the following vertical guiding modes being separate from the initial vertical guiding mode or another following vertical guiding mode, and a plateau guiding mode; and
    composing the vertical path of the aircraft from the determined path segments and freezing the vertical path such that the vertical path cannot be modified during the implementation of the following steps of the method;
    determining a status of each of the plurality of altitude constraints along the entire vertical path of the aircraft after determining the vertical path of the aircraft, each status of the plurality of altitude constraints being chosen from one of: (i) an achievable status when the corresponding altitude constraint is satisfied during passage of the aircraft along the vertical path of the aircraft, and (ii) a missed status otherwise; and
    displaying the vertical path of the aircraft and the statuses of the plurality of altitude constraints to the operator,
    wherein at least one following vertical guiding mode, the piloting instruction associated with the following vertical guiding mode and the instruction associated with the initial vertical guiding mode are defined by the operator or are communicated by an air traffic control entity or by an avionics system.

2. The method according to claim 1, wherein for each altitude constraint having the missed status, the determining statuses further comprises determining an altitude error corresponding to the vertical distance between this altitude constraint and the vertical path of the aircraft.

3. The method according to claim 2, wherein the displaying further comprises displaying each of the determined altitude errors.

4. The method according to claim 1, wherein the at least one following vertical guiding mode comprises an automatic vertical guiding mode.

5. The method according to claim 4, wherein, when, during the determination of a subsequent path segment with the automatic vertical guiding mode, at least one altitude constraint is on a same altitude as the selection point from which the subsequent path segment extends, this subsequent path segment comprises a horizontal path extending up to said altitude constraint.

6. The method according to claim 4, wherein, during the determination of a subsequent path segment with the automatic vertical guiding mode, the subsequent path segment successively comprises a rejoining path and a path subsequent a previously determined reference profile,
    the rejoining path extending from the corresponding selection point up to an intersection with the reference profile and the subsequent path extending from the intersection.

7. The method according to claim 6, wherein, when the altitude of the corresponding selection point is located below the reference profile, the rejoining path has a horizontal path extending up to the intersection with the reference profile.

8. The method according to claim 6, wherein the displaying further comprises displaying a symbol indicating the intersection of the rejoining path with the reference profile.

9. The method according to claim 1, wherein each of the piloting instructions is determined by one of the elements chosen from:
    altitude;
    length of time;
    horizontal distance from the current position of the aircraft;
    speed of the aircraft;
    intersection with a reference profile; and
    intersection with a given lateral path.

10. The method according to claim 1, wherein the freezing of the vertical path comprises freezing the entire vertical path such that the entire vertical path cannot be modified.

11. A computer program product comprising software instructions which, when implemented by a piece of computer equipment, carry out a method of determining a vertical path of an aircraft initiated from a current position, the aircraft being piloted by an operator and being guided by an automatic pilot according to an initial vertical guiding mode, in the presence of a plurality of altitude constraints and according to at least one piloting instruction, the method including:

determining a vertical path of the aircraft including:
  determining an initial path segment with the initial vertical guiding mode from the current position of the aircraft to a selection point, and a number N of subsequent path segments, the number N being greater than or equal to 1, each subsequent path segment being determined with a following vertical guiding mode implemented by the automatic pilot and extending between two consecutive selection points or between a selection point and a final point corresponding to a final destination of the aircraft, each of the selection points corresponding to a point in which a piloting instruction is achieved;
  at least one of the following vertical guiding modes being separate from the initial vertical guiding mode or another following vertical guiding mode, and a plateau guiding mode; and
  composing the vertical path of the aircraft from the determined path segments and freezing the vertical path such that the vertical path cannot be modified during the implementation of the following steps of the method;
determining a status of each of the plurality of altitude constraints along the entire vertical path of the aircraft after determining the vertical path of the aircraft, each status of the plurality of altitude constraints being chosen from one of: (i) an achievable status when the corresponding altitude constraint is satisfied during passage of the aircraft along the vertical path of the aircraft, and (ii) a missed status otherwise; and
displaying the vertical path of the aircraft and the statuses of the plurality of altitude constraints to the operator,
wherein at least one following vertical guiding mode, the piloting instruction associated with the following vertical guiding mode, and the instruction associated with the initial vertical guiding mode are defined by the operator or are communicated by an air traffic control entity or by an avionics system.

12. A determining system for determining a vertical path of an aircraft initiated from a current position, the aircraft being piloted by an operator and being guided by an automatic pilot according to an initial vertical guiding mode, in the presence of a plurality of altitude constraints and according to at least one piloting instruction;
the determining system comprising a processor and a non-transitory memory having computer-executable instructions stored thereon configured to cause the processor to:
determine a vertical path of the aircraft including:
  determining an initial path segment with the initial vertical guiding mode from the current position of the aircraft to a selection point, and a number N of subsequent path segments, the number N being greater than or equal to 1, each subsequent path segment being determined with a following vertical guiding mode implemented by the automatic pilot and extending between two consecutive selection points or between a selection point and a final point corresponding to a final destination of the aircraft, each of the selection points corresponding to a point in which a piloting instruction is achieved;
  at least one of the following vertical guiding modes being separate from the initial vertical guiding mode or another following vertical guiding mode, and a plateau guiding mode; and
  composing the vertical path of the aircraft from the determined path segments and freezing the vertical path such that the vertical path cannot be modified during the implementation of the following steps of the method;
determine a status of each of the plurality of altitude constraints along the entire vertical path of the aircraft after determining the vertical path of the aircraft, each status of the plurality of altitude constraints being chosen from one of: (i) an achievable status when the corresponding altitude constraint is satisfied during passage of the aircraft along the vertical path of the aircraft, and (ii) a missed status otherwise; and
display the vertical path of the aircraft and the statuses of the plurality of altitude constraints to the operator,
wherein at least one following vertical guiding mode, the piloting instruction associated with the following vertical guiding mode, and the instruction associated with the initial vertical guiding mode are defined by the operator or are communicated by an air traffic control entity or by an avionics system.

13. The determining system according to claim 12, being on board the aircraft.

14. The determining system according to claim 12, having an off-board system interfaced with the aircraft.

* * * * *